United States Patent
Wildeman

(10) Patent No.: US 10,745,838 B2
(45) Date of Patent: Aug. 18, 2020

(54) RECYCLABLE SHOE INSOLE AND RELATED METHOD

(71) Applicant: TIETEX INTERNATIONAL, LTD., Spartanburg, SC (US)

(72) Inventor: Martin Wildeman, Spartanburg, SC (US)

(73) Assignee: TIETEX INTERNATIONAL LTD., Spartansburg, SC (US)

( * ) Notice: Subject to any disclaimer, the term of this patent is extended or adjusted under 35 U.S.C. 154(b) by 1048 days.

(21) Appl. No.: 14/732,973

(22) Filed: Aug. 6, 2015

(65) Prior Publication Data
US 2015/0359295 A1    Dec. 17, 2015

Related U.S. Application Data

(60) Provisional application No. 62/010,756, filed on Jun. 11, 2014.

(51) Int. Cl.
| | |
|---|---|
| *D05B 1/24* | (2006.01) |
| *A43B 13/38* | (2006.01) |
| *A43B 13/42* | (2006.01) |
| *D06C 7/02* | (2006.01) |
| *D06C 11/00* | (2006.01) |
| *D06C 19/00* | (2006.01) |
| *B32B 5/26* | (2006.01) |
| *B32B 5/02* | (2006.01) |
| *B32B 5/06* | (2006.01) |
| *D04B 21/16* | (2006.01) |

(52) U.S. Cl.
CPC ............... *D05B 1/24* (2013.01); *A43B 13/38* (2013.01); *A43B 13/42* (2013.01); *B32B 5/022* (2013.01); *B32B 5/026* (2013.01); *B32B 5/06* (2013.01); *B32B 5/26* (2013.01); *D04B 21/165* (2013.01); *D06C 7/02* (2013.01); *D06C 11/00* (2013.01); *D06C 19/00* (2013.01); *D05D 2209/10* (2013.01); *Y10T 428/2395* (2015.04); *Y10T 442/494* (2015.04)

(58) Field of Classification Search
CPC . Y10T 442/659; Y10T 442/66; Y10T 442/40; Y10T 442/463; Y10T 442/494; B32B 5/02; B32B 5/22; B32B 5/06; B32B 7/08; D04B 21/02; D04B 23/10; D04B 21/04; D04B 21/165; D10B 2403/0112; D10B 2501/0632; D10B 2509/02
See application file for complete search history.

(56) References Cited

U.S. PATENT DOCUMENTS

| | | | |
|---|---|---|---|
| 6,423,393 B1* | 7/2002 | Wildeman | D04H 1/52 28/162 |
| 6,855,392 B2* | 2/2005 | Wildeman | D04B 21/04 112/410 |
| 2004/0192142 A1* | 9/2004 | Zafiroglu | B32B 5/08 442/352 |
| 2007/0101771 A1* | 5/2007 | Wildeman | D04B 21/02 66/169 R |

* cited by examiner

*Primary Examiner* — Jennifer A Steele
(74) *Attorney, Agent, or Firm* — J.M. Robertson, LLC

(57) ABSTRACT

A Strobel Insole of fully recyclable stitch-bonded fabric for use in construction of a shoe using the "California Slip Last" construction method. The stitch-bonded fabric is substantially 100% polyester stitched with two different yarns in different patterns. One side of the stitch-bonded fabric is subject to abrasion to break filaments of a relatively low denier stitching yarn to yield a soft brushed surface. A method of insole fabric production is also provided.

17 Claims, 3 Drawing Sheets

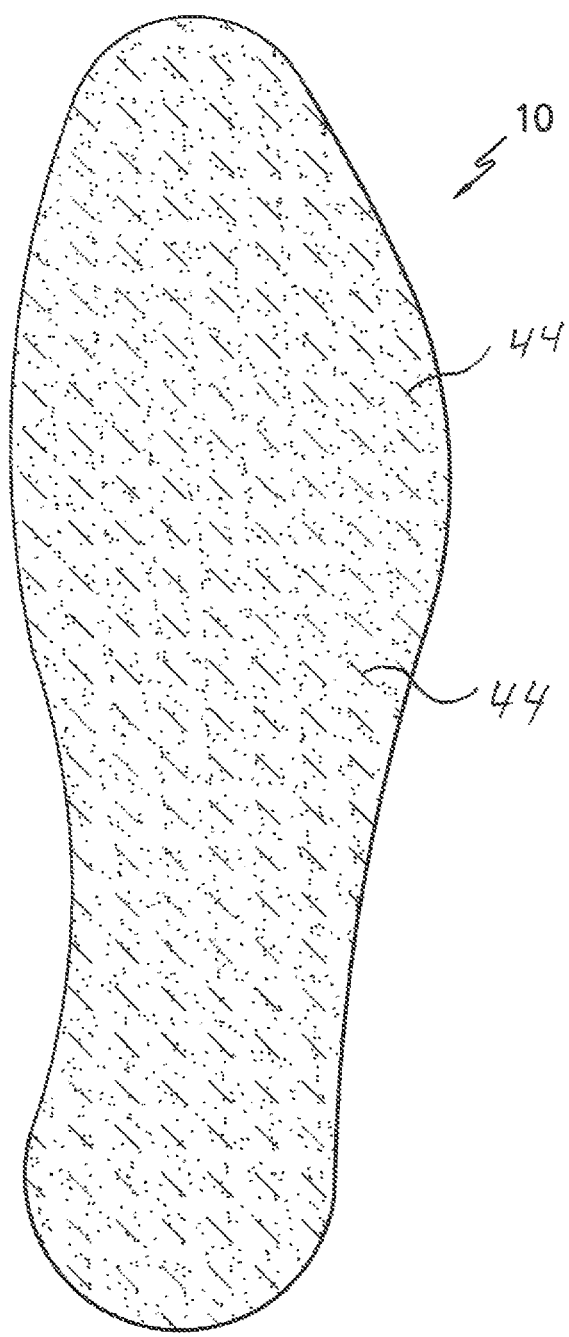
FIG. -1-

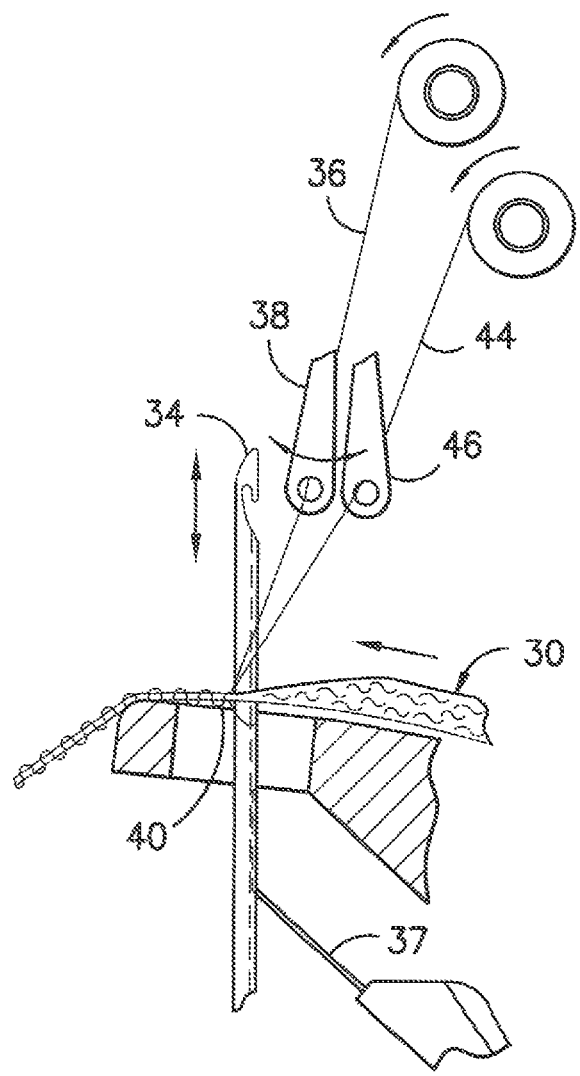
FIG. -2-

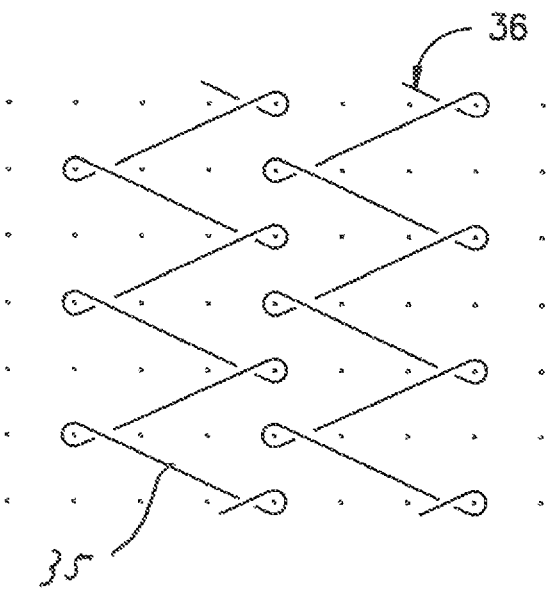
FIG. -3-
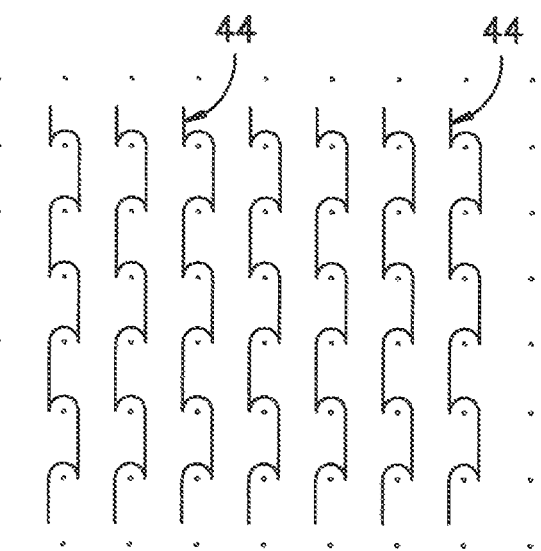
FIG. -4-

RECYCLABLE SHOE INSOLE AND RELATED METHOD

CROSS REFERENCE TO RELATED APPLICATION(S)

The present application claims the benefit of, and priority from, U.S. provisional application 62/010,756 which was filed on Jun. 11, 2014. All contents of such provisional application are hereby incorporated by reference in their entirety as if fully set forth herein.

TECHNICAL FIELD

The present disclosure relates to footwear, and more particularly, to a so called "Strobel Insole" (i.e. an affixed insole) of fully recyclable stitch-bonded fabric for use in construction of a shoe using the "California Slip Last" construction method. One side of the stitch-bonded fabric is subject to abrasion to break filaments of a relatively low denier stitching yarn and to yield a soft brushed surface. A method of insole fabric production is also provided.

BACKGROUND OF THE DISCLOSURE

The use of textile fabrics to form Strobel Insoles is known. The name "Strobel" was taken from the make of a German sewing machine that was originally used to produce shoes by a footwear construction method known as "California Slip Last". Eventually, the terminology morphed into "Strobel Insole" or just "Insole". In this regard, it is to be understood that the term "Strobel Insole" or "Insole" refers to the affixed insole of a shoe. This may be distinguished from the removable slip liner which is present in most athletic footwear.

The so called "California Slip Last" shoe construction became popular in the 1990s and has largely displaced the more traditional "Board Last" method, particularly in non-cleated athletic footwear. The process reduces material waste and is less capital intensive. In the "California Slip Last" process the Strobel Insole material is typically die-cut in the shape of the bottom of a person's foot. The shoe upper, which is typically fabric, is then sewn around the circumference of the Strobel Insole part to form a preliminary sock-like structure.

During the step of sewing the upper to the Strobel Insole, the sewing needle typically penetrates both the Strobel Insole and the upper material at approximately 2-3 mm from the edges of the materials to form the sock-like structure. Following the sewing step, the formed structure is then subjected to a so called "Lasting" process in which an insert called a "Last" resembling a foot is forced into the interior of the sock-like structure to establish a molded intermediate structure having the shape of a shoe. During the Lasting process, the Strobel Insole and the upper are subjected to substantial tensioning stress. The Strobel Insole material must have sufficient seam strength and low elongation properties under load in order to maintain consistent shoe size during the force of the Lasting process. After the Lasting process, glue is applied to the outside surface of the Strobel Insole and the midsole of the shoe is then adhered in underlying relation.

Stitch-bonding is a known process in which yarns are stitched through a substrate to form a coordinated web structure. By way of example only, and not limitation, exemplary stitch-bonding processes are disclosed in U.S. Pat. Nos. 6,855,392; 6,869,660; and 7,294,387 all of which are incorporated by reference as if fully set forth herein. In the past, Strobel Insole fabrics have been made by a stitch-bonding process utilizing a substrate of a carded and cross-lapped fleece containing a blend of polyester and bicomponent polyester fibers. The bicomponent fibers are typically a sheath/core configuration in which the core is made of PET polyester and the sheath is formed of lower melting point, co-polyester.

In accordance with the past practice, during the stitch-bonding process, the carded and cross-lapped fleece is stitched with polyester filament in closely spaced substantially parallel stitch lines in order to achieve strength, length direction stability and good seam holding properties. The resulting fabric is then heat set on a tenter frame. During heat setting, the sheath of the bicomponent fiber sheath melts and bonds to other fibers to provide dimensional stability in the cross machine direction of the fabric. Because this material is 100% polyester, the die-cutting waste can be collected, melted and extruded into polyester chip material. This polyester chip material can then be reprocessed back into polyester fiber and used again, This yields a closed-loop recycling process.

While the past formation practices have been highly functional, most current stitch-bonded fabric constructions used in Strobel Insoles are deemed to have a relatively rough surface feel. Recently, more attention has been given to the softness of the surface of the Strobel Insole surface inside the shoe. Although removable slip liners typically cover the Strobel Insole in the shoe, it has been found that in some instances it may be beneficial for the Strobel Insole itself to present a soft exterior surface. By way of example only, it is believed that such a soft exterior surface may be desirable to some users who remove the slip liner for insertion of an electronic device into a slot in the Strobel Insole for purposes of gathering performance data during use.

To reduce the surface roughness of the Strobel Insole, it is common for thin EVA foam materials to be laminated to Strobel Insole fabrics in order to provide a softer surface feel inside the shoe. However, a disadvantage of such foam lamination is that the die-cutting waste is no longer easily recyclable because the glue, fabric and foam are no longer compatible with each other in the recycling process. That is, the 100% polyester construction is sacrificed.

Accordingly a stitch-bonded Strobel Insole which provides reduced surface roughness while also being fully recyclable in a closed-loop system would be of substantial benefit.

SUMMARY OF THE DISCLOSURE

The present disclosure provides advantages and alternatives over the state of the art by providing a Strobel Insole of substantially 100% polyester suitable for recycling in a fully closed loop system and which further includes a desirable soft surface feel.

In accordance with one exemplary aspect, the present disclosure provides a method of forming a Strobel Insole fabric. The method includes the steps of providing a substantially 100% polyester fibrous substrate including a first polyester fiber constituent and a second polyester fiber constituent. The second polyester constituent is characterized by a lower melting point than the first polyester constituent. A stitch-bonded fabric with a plurality of parallel needle perforation lines is formed by stitch-bonding the 100% polyester fibrous substrate with a first polyester yarn of multi-filament construction defining a texturing yarn and with a second polyester yarn defining a ground yarn. The texturing yarn has a lower denier than the ground yarn. The texturing yarn is stitched in a zigzag pattern with underlap float segments crossing between needle perforation lines across one side of the stitch-bonded fabric. The ground yarn is stitched without shifting between needle perforation lines. The stitch-bonded fabric is heated to melt or soften the second polyester fiber constituent. The stitch-bonded fabric is then cooled. The stitch-bonded fabric is abraded to break at least a portion of the underlap float segments and to produce a pile surface of broken filaments from the underlap float segments. A resulting Strobel Insole fabric is also provided.

BRIEF DESCRIPTION OF THE DRAWINGS

The accompanying drawings, which are incorporated in, and which constitute a part of this specification, illustrate exemplary constructions and procedures in accordance with the present disclosure and, together with the general description of the disclosure given above and the detailed description set forth below, serve to explain the principles of the disclosure wherein:

FIG. 1 is a schematic view of a stitch-bonded Strobel Insole consistent with the present disclosure;

FIG. 2 illustrates schematically a two bar stitch-bonding process for selectively stitching a texturing yarn system and a cooperating ground yarn system through a substrate;

FIG. 3 is a needle-point diagram illustrating an exemplary stitch pattern for a texturing yarn in accordance with the present disclosure; and FIG. 4 is a needle-point diagram illustrating an exemplary stitch pattern for a ground yarn in accordance with the present disclosure.

While exemplary features of the disclosure have been illustrated and are generally described above and will hereinafter be described in connection with certain potentially preferred embodiments and practices, it is to be understood that in no event is the disclosure limited to such illustrated and described embodiments and practices. On the contrary, it is intended that the present disclosure shall extend to all alternatives and modifications as may embrace the general principles of this disclosure within the full and true spirit and scope thereof.

DESCRIPTION OF THE PREFERRED EMBODIMENT(S)

Reference will now be made to the drawings, wherein like elements are designated by like reference numerals in the various views. The present disclosure provides a Strobel Insole 10 (FIG. 1) formed from a substantially 100% polyester, 2 bar stitch-bonded fabric. That is, the stitch-bonded fabric incorporates two different stitching yarns which may be stitched in different patterns. One side of the Strobel Insole 10 is abraded to break extended length underlap yarn segments so as to yield a surface of raised fibrils to define a brushed short pile of reduced tactile roughness relative to the opposing side of the Strobel Insole 10 (FIG. 1).

Referring now to FIG. 2, in the illustrated exemplary practice, a fibrous substrate material 30 is conveyed to a stitch-forming position in the direction indicated by the arrow. By way of example only, and not limitation, one potentially desirable substrate material 30 is a carded and cross-lapped fleece formed from about 10% to about 50% bicomponent polyester fibers 160 C melting point (4 denier× 102 mm) with a sheath/core configuration in which the core is made of PET polyester and the sheath is formed of lower melting point, co-polyester and about 50% to about 90% standard PET polyester staple fibers (4 denier×102 mm). In one exemplary practice, the fleece may have a mass per unit area of about 100 to about 300 grams per square meter. As will be appreciated, while the substrate material 30 may be formed from a blend of polyester fiber and bicomponent polyester fiber with a reduced melting point constituent, it is likewise contemplated that other low melting point polyester constituents such as low melting point polyester staple fiber or the like may be substituted for the bicomponent fiber if desired.

As will be appreciated by those of skill in the art, the stitch-forming position is defined by a row of reciprocating needles 34, extending in adjacent relation to one another substantially transverse to the direction of movement of the substrate material 30. While only a single needle has been illustrated, in actual practice a large number of such needles may be arranged in close relation to one another in the cross-machine direction. It is contemplated that the so-called gauge or needle density in the cross machine direction may be adjusted as desired. By way of example only, and not limitation, it is contemplated that the needle density may be in the range of about 7 to about 28 needles per inch and more preferably about 12 to about 18 needles per inch. However, higher and lower needle densities may be used if desired. In accordance with one embodiment, the stitch density in the machine direction may be in the range of about 5 to 20 courses per inch, and more preferably about 8 to 12 courses per inch, although higher and lower machine direction stitch densities may likewise be used if desired.

According to the illustrated exemplary practice, two yarns systems (i.e. two bars) are used to form stitches through the substrate material 30. In the illustrated two bar practice, texturing yarns 36 forming a first yarn system are carried through a first set of moveable yarn guides 38 manipulated by a front guide bar (not shown) for engagement with needles 34, across the width of the substrate material 30. In this regard, while only a single texturing yarn 36 is illustrated, it will be understood that in practice multiple texturing yarns are present across the width of the stitch-forming apparatus. By way of example only, and not limitation, the texturing yarns 36 may be relatively fine denier yarns having a linear density of about 20 denier to about 100 denier. One such suitable texturing yarn for use in a Strobel Insole is a 70 denier/36 filament polyester yarn. However, other yarn constructions and filament counts may likewise be utilized if desired.

As best illustrated in FIG. 3, the texturing yarns 36 may be partially threaded such that every needle 34 does not engage the texturing yarns 36. Moreover, the texturing yarns 36 may be shifted or "shogged" back and forth between the threaded needle positions during the stitching operation to form a pattern of relatively long diagonal underlap float segments 35 disposed in a zigzag pattern across one side of the fabric. In this regard, it will be understood that the term "underlap float segments" refers to segments of stitching yarn extending between needle lines across the technical back of the fabric as a result of shifting the stitching yarn between threaded needle positions during stitching. These float segments preferably extend laterally a distance so as to span at least two needle lines, and more preferably, three or more needle perforation lines as may be desired. By way of example only, and not limitation, one exemplary stitch notation as illustrated in FIG. 3 is 1,0/3,4. Alternative stitch notations which provide an extended length underlap suitable for brushed pile formation in accordance with the present disclosure may include (1,0/2,3); (1,0/4,5); (1,0/5,6) and the like which yield lateral yarn shift of at least two needle perforation positions.

In the illustrated exemplary two bar practice, ground yarns 44 forming a second yarn system are carried through a second set of moveable yarn guides 46 manipulated by a back guide bar (not shown) for engagement with needles 34, across the width of the substrate material 30. While only a single ground yarn 44 is illustrated, it will be understood that in practice multiple ground yarns are present across the width of the stitch-forming apparatus. By way of example only, and not limitation, the ground yarns 44 may have a linear density of about 120 denier to about 400 denier. One such suitable yarn for use in a Strobel Insole is a 150 denier/36 filament polyester yarn. However, other yarn constructions and filament counts may likewise be utilized if desired.

As best illustrated in FIG. 4, according to the potentially preferred practice, the ground yarns may be in a fully threaded arrangement to engage each needle. In operation, each ground yarn 36 preferably engages a single needle 34 which moves up and down in a reciprocating manner through the substrate material 30. As will be appreciated by those of skill in the art, the needle 34 engages a closing wire 37 to close the needle on the downstroke and to reopen it on the upstroke so as to form an arrangement of stitch lines running in the machine direction along the length of the substrate material. As illustrated schematically in FIG. 3, the ground yarns 44 may be stitched according to a standard chain stitch notation and do not cross between needle perforation lines. According to one desirable practice, the stitch lines formed by the ground yarns 36 may be sufficiently close to substantially cover the upper surface of the substrate material 30.

As noted previously, after stitching, the fabric is may be heatset at a temperature sufficient to cause the low melting point co-polyester in the fleece to soften and/or melt and to bond with other fibers upon resolidification. This bonding upon resolidification thus provides dimensional stability in the cross-machine direction.

In accordance with a further exemplary practice, following formation, the fabric may be subjected to an abrading treatment such as napping, sanding or the like across the side having the long underlap float segments 35 of fine denier yarn. This abrading treatment results in the breakage of the fine denier texturing yarns 36 making up the underlaps. The breakage of the fine denier texturing yarns 36 causes the yarn filaments to form a relatively soft, short pile brushed outer surface. In this regard, the short pile which is formed substantially surrounds and covers the segments of the heavier ground yarns 44 at the side subjected to the abrading treatment. However, despite breakage of the fine denier texturing yarns, dimensional stability is not sacrificed since the chain stitches of the heavier ground yarns 44 which do not have extended length float segments are not substantially impacted. The resulting fabric thus has one brushed side with a short pile surface of filaments from the broken texturing yarns 36 (shown as dots in FIG. 1) substantially surrounding and covering unbroken segments of ground yarns 44. Moreover, because all components of the fabric are polyester, any cutting waste is fully recyclable in a closed loop system.

Working Example

The disclosure may be further understood through reference to the following non-limiting example.

A two-bar stitch bonded fabric was formed at a construction density of 28 gauge and 29 courses per inch. The stitching substrate was a fleece formed of 30% bicomponent polyester fibers 160 C melting point (4 denier×102 mm) and 70% Polyester (4 denier×102 mm). The fleece had a mass per unit area of 150 grams per square meter. The front bar yarn was a 70 denier/36 filament polyester stitched according to a notation of 1,0/3,4 so as to provide a long zig-zag crossing underlap between stitch points. The back bar yarn was a 150 denier/36 filament polyester stitched according to a standard chain stitch notation of 1,0/0,1. The fabric was finished by heatsetting at 180 C so as to cause flow and bonding by the bicomponent polyester within substrate thereby providing cross-machine stability. The substrate was then subjected to napping across the underlap surface so as to break and raise fibers from the front bar yarn. The resulting fabric had stability sufficient for use as a Strobel Insole fabric while presenting a soft, brushed outer surface. All components of the fabric were fully compatible for closed loop recycling back to polyester chip.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming a Strobel Insole fabric comprising the steps of:
    providing a substantially 100% polyester fibrous substrate including a first polyester constituent and a second polyester constituent, wherein the second polyester constituent is characterized by a lower melting point than the first polyester constituent;
    forming a stitch-bonded fabric with a plurality of parallel needle perforation lines by stitch-bonding the fibrous substrate with a first polyester yarn of multi-filament construction defining a texturing yarn and with a second polyester yarn defining a ground yarn, wherein the texturing yarn has a lower denier than the ground yarn and wherein the texturing yarn is stitched in a zigzag pattern with underlap float segments extending between needle perforation lines across one side of the stitch-bonded fabric, wherein the underlap float segments do not form raised loops and wherein the ground yarn is stitched without shifting between needle perforation lines, the texturing yarn and the ground yarn being stitched into the fibrous substrate from a common side of the fibrous substrate;

heating the stitch-bonded fabric to melt or soften the second polyester constituent;

cooling the stitch-bonded fabric following the heating step; and abrading said one side of the stitch-bonded fabric to break at least a portion of the underlap float segments and to produce a pile surface of broken filaments from the underlap float segments.

2. The method as recited in claim 1, wherein the first polyester constituent and the second polyester constituent are each fibers.

3. The method as recited in claim 2, wherein the first polyester constituent is a polyester staple fiber and the second polyester constituent is a core-sheath bicomponent fiber.

4. The method as recited in claim 1, wherein the texturing yarn has a linear density of about 20 denier to about 100 denier.

5. The method as recited in claim 4, wherein the ground yarn has a linear density of about 120 denier to about 400 denier.

6. The method as recited in claim 5, wherein the ground yarn is a multi-filament yarn.

7. The method as recited in claim 5, wherein the texturing yarn is stitched in a zigzag pattern such that the underlap float segments extend a lateral distance spanning at least 2 needle perforation lines.

8. The method as recited in claim 5, wherein the texturing yarn is stitched in a zigzag pattern such that the underlap float segments extend a lateral distance spanning at least 3 needle perforation lines.

9. The method as recited in claim 5, wherein the texturing yarn is stitched in a zigzag pattern with a stitch notation of (1,0/3,4).

10. The method as recited in claim 5, wherein the texturing yarn is stitched in a zigzag pattern with a stitch notation selected from the group consisting of (1,0/2,3); (1,0/4,5); and (1,0/5,6).

11. The method as recited in claim 1, wherein the texturing yarn has a linear density of about 20 denier to about 100 denier and wherein the ground yarn is a multi-filament yarn with a linear density of about 120 denier to about 400 denier and wherein the ground yarn is stitched in a fully threaded chain stitch pattern.

12. A substantially 100% polyester Strobel Insole fabric formed by the method of claim 1.

13. A method of forming a Strobel Insole fabric comprising the steps of:

providing a substantially 100% polyester fibrous substrate including a first polyester fiber constituent and a second polyester fiber constituent, wherein the second polyester fiber constituent is characterized by a lower melting point than the first polyester fiber constituent;

forming a stitch-bonded fabric with a plurality of parallel needle perforation lines by stitch-bonding the fibrous substrate with a first polyester yarn of multi-filament construction defining a texturing yarn having a linear density of about 20 denier to about 100 denier and with a second polyester yarn defining a ground yarn having a linear density of about 120 denier to about 400 denier, and wherein the texturing yarn is stitched in a zigzag pattern with underlap float segments extending a lateral distance spanning at least 2 needle perforation lines across one side of the stitch-bonded fabric, wherein the underlap float segments do not form raised loops and wherein the ground yarn is stitched without shifting between needle perforation lines, the texturing yarn and the ground yarn being stitched into the fibrous substrate from a common side of the fibrous substrate;

heating the stitch-bonded fabric to melt or soften the second polyester fiber constituent;

cooling the stitch-bonded fabric following the heating step; and abrading said one side of the stitch-bonded fabric by napping to break at least a portion of the underlap float segments and to produce a pile surface of broken filaments from the underlap float segments.

14. The method as recited in claim 13, wherein the texturing yarn is stitched in a zigzag pattern with a stitch notation of (1,0/3,4).

15. The method as recited in claim 13, wherein the texturing yarn is stitched in a zigzag pattern with a stitch notation selected from the group consisting of (1,0/2,3); (1,0/4,5); and (1,0/5,6).

16. The method as recited in claim 1, wherein the ground yarn is stitched in a fully threaded chain stitch pattern.

17. A substantially 100% polyester Strobel Insole fabric formed by the claim 13.

* * * * *